United States Patent [19]

Leonard

[11] 4,284,096
[45] Aug. 18, 1981

[54] AUTOMATIC TRANSMISSION GOVERNOR HAVING DECELERATION SENSITIVE PRESSURE SWITCHING FEATURE

[75] Inventor: Allan S. Leonard, Livonia, Mich.

[73] Assignee: Ford Motor Company, Dearborn, Mich.

[21] Appl. No.: 156,237

[22] Filed: Jun. 4, 1980

[51] Int. Cl.³ .............................................. G05D 13/66
[52] U.S. Cl. .................................. 137/48; 74/752 C; 137/54
[58] Field of Search ................. 74/752 C; 137/48, 51, 137/54, 56

[56] References Cited

U.S. PATENT DOCUMENTS

| | | | |
|---|---|---|---|
| 2,630,815 | 3/1953 | Worthing | 137/48 |
| 2,711,749 | 6/1955 | Hettinger | 137/56 |
| 2,887,119 | 5/1959 | Lee | 137/48 |
| 2,889,884 | 6/1959 | McFarland | 137/54 |
| 2,911,987 | 11/1959 | Wayman | 137/51 |
| 3,032,049 | 5/1962 | Schulz | 137/56 |
| 3,043,322 | 7/1962 | Schulz | 137/54 |
| 3,523,597 | 8/1970 | Lemieux | 192/4 |
| 3,578,120 | 5/1971 | Hilpert | 137/56 X |

*Primary Examiner*—Robert G. Nilson
*Attorney, Agent, or Firm*—Donald J. Harrington; Keith L. Zerschling

[57] ABSTRACT

A fluid pressure governor adapted to sense the driven speed of an automatic transmission torque output shaft and to develop a speed signal that may be used by an automatic transmission control circuit in conjunction with a torque demand or engine torque signal to control automatic ratio changes in a transmission mechanism as torque is delivered from a vehicle engine to vehicle traction wheels. Provision is made for interrupting the speed signal distribution to the control elements of the transmission mechanism when deceleration of the vehicle exceeds a critical value thus causing the transmission mechanism to downshift to higher torque ratios during rapid deceleration of the vehicle and thereby eliminating any tendency of the vehicle engine to stall or to malfunction as a result of braking of the vehicle.

3 Claims, 12 Drawing Figures

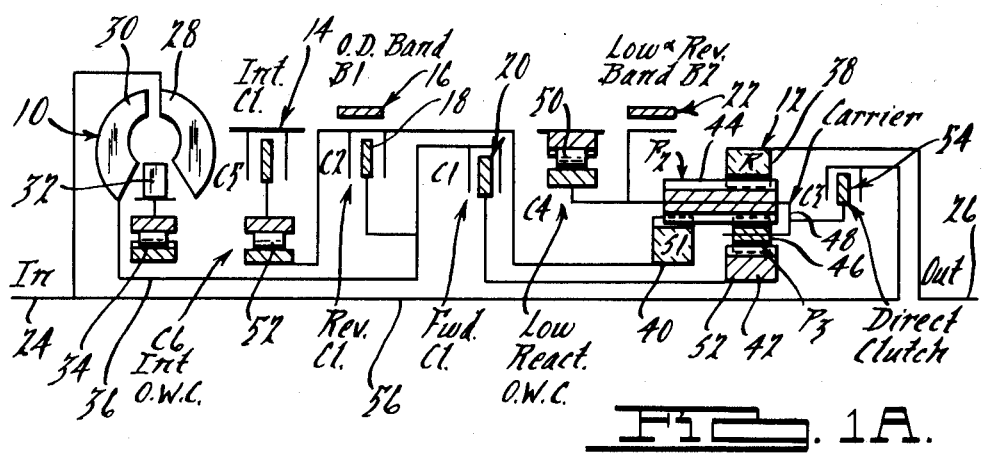
FIG. 1A.
| Control Ele. Ratio | | B1 | B2 | C1 | C2 | C3 | C4 | C5 | C6 | Ratio | |
|---|---|---|---|---|---|---|---|---|---|---|---|
| 1st | M | | X | X | | | X | | | R2/52 | 2.400 |
| | D | | | X | | | X | | | | |
| 2nd | | | | X | | | X | X | X | R(51+52)/52(R+51) | 1.467 |
| 3rd | | | | X | | X | X | | | 1.00 | 1.000 |
| 4th | | X | | | | X | X | | | R/(R+51) | .667 |
| Rev. | | | X | | X | | | | | R/51 | 2.000 |
FIG. 1B.
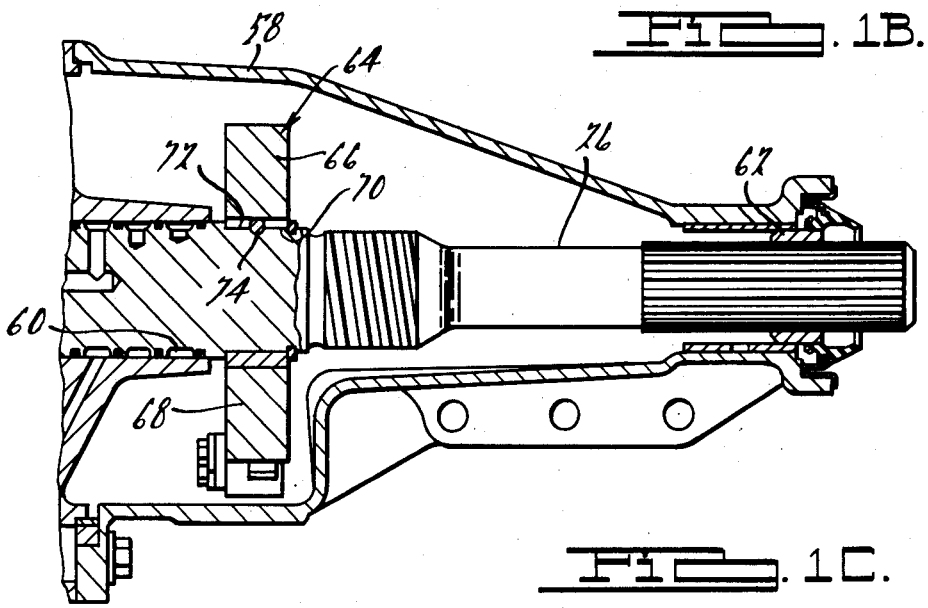
FIG. 1C.

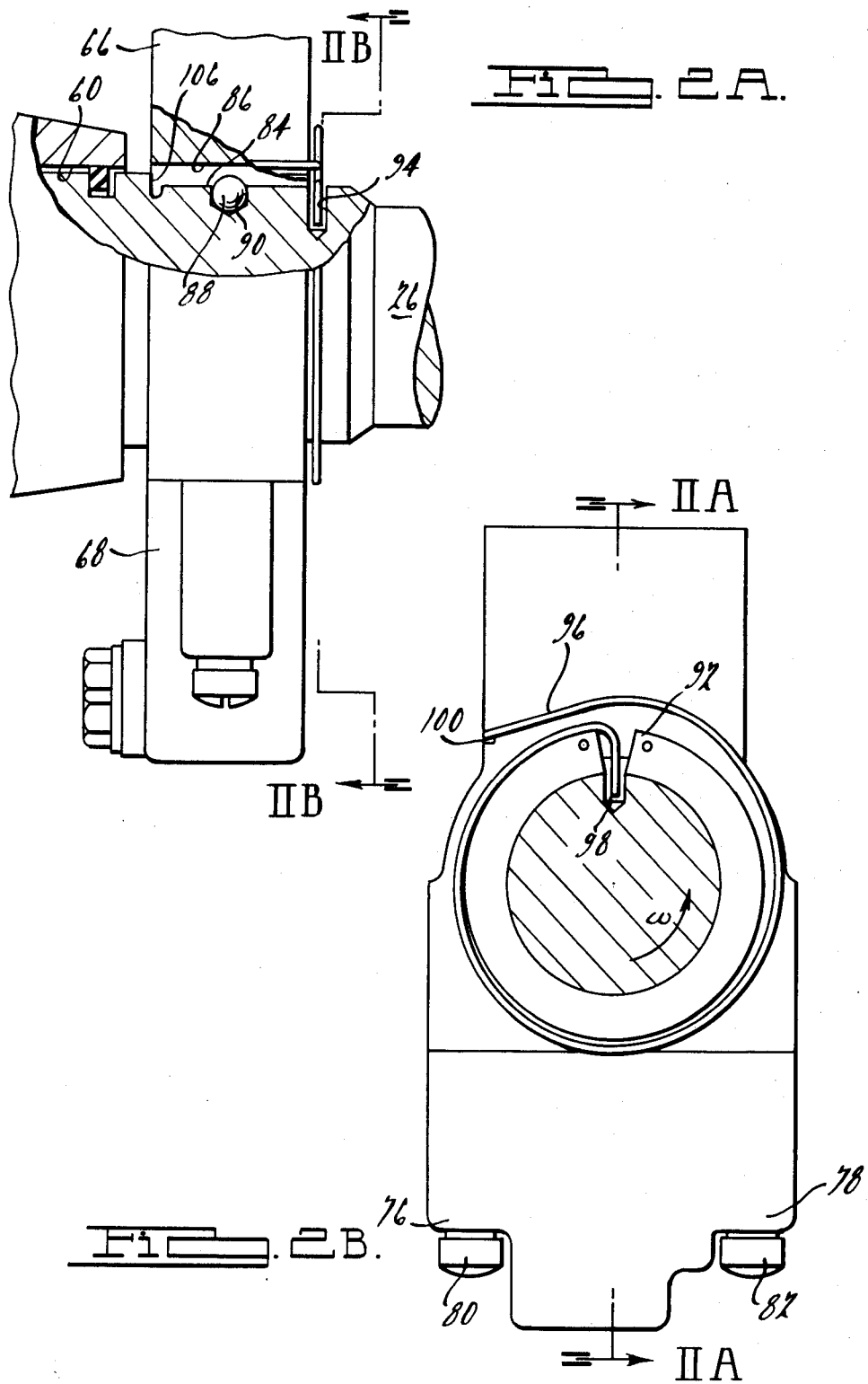

AUTOMATIC TRANSMISSION GOVERNOR HAVING DECELERATION SENSITIVE PRESSURE SWITCHING FEATURE

GENERAL DESCRIPTION OF THE INVENTION

My invention comprises improvements in a compound fluid pressure governor of the type shown in U.S. Pat. Nos. 3,032,049; 2,911,987; 2,889,844 and 2,711,749. Each of these patents shows a governor for an automatic transmission comprising a governor body mounted on a driven shaft. It is adapted to rotate with the driven shaft to develop a pressure signal that is sensitive to the speed of rotation of the driven shaft. That signal is routed through suitable porting and internal passages in the transmission mechanism to shift valves that control ratio changes in the gearing for the transmission. The governor pressure develops a speed pressure force on shift valves in the mechanism and that force is opposed by a torque demand signal or an engine torque signal. The shift valves respond to differences in the forces developed by these opposed signal pressures to initiate ratio changes.

The shift valves control distribution of pressure from a transmission driven positive displacement pump to clutch and brake elements in the transmission assembly that in turn control relative motion of the gear elements and establish and disestablish torque flow paths and establish as well torque reaction points to effect a transfer of reaction torque to a stationary housing.

A typical transmission mechanism that is adapted to embody the governor mechanism of the kind shown in these prior art patents is illustrated and described in copending application Ser. No. 82,399, filed Oct. 5, 1979, entitled "Multiple Ratio Overdrive Transmission". The inventors are R. S. Leonard, R. C. Bolz and L. D. Burcz, assignors to Ford Motor Company.

The mechanism shown in the Leonard et al application includes a hydrokinetic torque converter and a compound planetary gear system that cooperate to define torque delivery paths from an internal combustion engine to a driven shaft, the driven shaft in turn being connected to vehicle traction wheels through a driveline and differential mechanism. The gearing provides four forward driving speed ratios, the highest ratio of which is an overdrive ratio. When the transmission is operated in the first and second underdrive ratios, the hydrokinetic torque converter transmits therethrough the entire engine torque made available to the traction wheels. The torque converter multiplies the engine torque during initial acceleration. The torque converter includes a turbine that serves as a torque input element for the gearing. The clutch and brake mechanism for the transmission establishes a maximum torque ratio in the gearing during low speed ratio operation. A ratio change to the second drive ratio occurs as one torque reaction brake is released and another is applied. The engine torque, however, is distributed through the hydrokinetic torque converter as it does in the case of first ratio operation.

Third speed ratio operation is a split torque drive in which a portion of the torque is delivered hydrokinetically through the converter and the balance is distributed mechanically to the gearing. The gearing at that time is adapted to establish a one-to-one drive ratio. A ratio change to the overdrive fourth ratio is achieved by actuating a different reaction brake for the gearing as the others are released. A friction clutch establishes a direct connection between the input elements of the gearing and the engine as the hydrokinetic torque converter is bypassed. Thus the torque delivery path established during overdrive fourth ratio operation is fully mechanical.

During deceleration of the vehicle with the transmission conditioned for overdrive operation or for direct drive, third ratio operation, it is necessary for the engine to be driven by the torque delivery shaft that normally functions as a torque output shaft. Because the torque delivery path through the transmission that is established as torque is delivered in the reverse direction during coasting and deceleration of the vehicle is fully mechanical or partially mechanical, there may be a tendency for the engine to stall. This is true especially when the vehicle is decelerated at a high rate. The improvement of my invention makes it possible for the transmission to respond quickly to changes in the angular velocity of the output shaft during vehicle braking with the transmission in the direct or overdrive ranges so that the transmission control system will downshift the transmission to the second ratio as quickly as possible thereby reducing the possible tendency of the engine to stall.

My invention includes a governor assembly that is mounted on the driven shaft and that normally develops a fluid pressure speed signal used by the control system to initiate ratio changes, the speed signal acting in conjunction with a torque signal or a torque demand signal, as previously mentioned, to control drive range changes and to establish a proper ratio for any given driving condition. The downshifting is achieved during rapid deceleration of the vehicle by interrupting the supply of governor pressure signal to the shift valves that control the selection of the drive ranges or torque ratios in the gearing mechanism.

The governor assembly is keyed to the output shaft and is allowed to rotate with it during normal operation. Provision is made, however, for permitting the governor assembly to shift angularly with respect to the axis of the output shaft during high rates of deceleration of the output shaft. Normally the governor assembly is maintained by a preload spring force to establish orientation of an output pressure signal port in the governor mechanism with respect to a governor pressure passage that leads to the shift valves. When the vehicle is decelerated rapidly with the output shaft is in forward motion, the momentum of the governor assembly overcomes the force of the preload and allows the assembly to rotate together relative to the shaft until it contacts a stop. At that time fluid passages between the counterweight and the shaft are misaligned and governor pressure developed by the governor mechanism is caused to vent through an exhaust port that becomes aligned with the governor output port of the governor assembly. Simultaneously, the supply port for the governor assembly is blocked.

As deceleration terminates or decreases to a rate below a threshold value, the governor mechanism will be moved angularly under the influence of the preload spring, thereby establishing normal orientation of the ports in the governor assembly that communicate with the governor pressure delivery passage extending to the shift valves.

I am aware of prior art U.S. Patent to Lemieux No. 3,523,597 which discloses a downshift valve in a torque converter transmission to increase engine braking during application of the wheel brakes. That disclosure, however, does not include an inertia sensitive governor for effecting a forced downshift during braking. Furthermore, the problem with which the present invention is concerned is not present in the Lemieux transmission because of the cushioning action of the torque converter in the Lemieux transmission.

BRIEF DESCRIPTION OF THE FIGURES OF THE DRAWINGS

FIG. 1A is a schematic representation of a gear system of the kind disclosed in application Ser. No. 82,399, filed Oct. 5, 1979, entitled "Multiple Ratio Overdrive Transmission", by A. S. Leonard et al. That transmission mechanism is adapted to accommodate the improved governor mechanism of my invention.

FIG. 1B is a table that shows the clutch-and-brake engagement and release pattern for establishing the various ratios in the gear system shown in FIG. 1A.

FIG. 1C is a cross-sectional view of the tailshaft and tailshaft housing for a transmission mechanism of the kind shown in FIG. 1A. The governor assembly of my invention is shown generally in this view.

FIG. 2A is a cross-sectional view shown in enlarged form illustrating the governor mechanism mounted on a tailshaft for a transmission of the kind shown in FIG. 1A. It is taken along the plane of sectional line 2A—2A of FIG. 2B.

FIG. 2B is an end view of the governor assembly shown in FIG. 2A as seen from the plane of sectional line 2B—2B of FIG. 2A.

PARTICULAR DESCRIPTION OF THE INVENTION

Figures 3A, 3B:
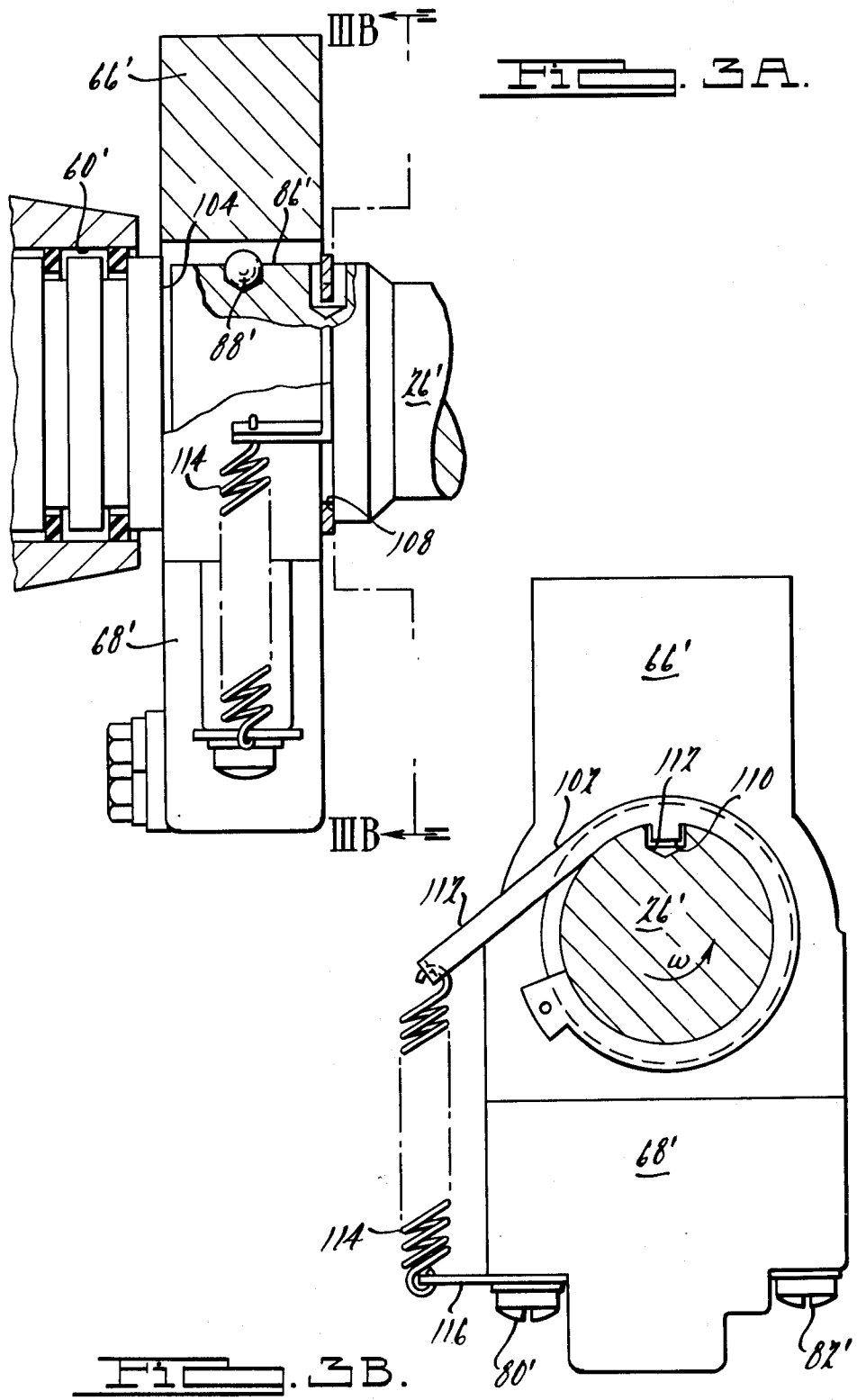
FIG. 3A shows a side elevation view of a governor of a modified form and which is capable of the function of the embodiment of FIGS. 2A and 2B.
FIG. 3B is an end of the structure of FIG. 3A as seen from the plane of section line 3B—3B of FIG. 3A.

In FIG. 1A reference numeral 10 designates generally a hydrokinetic torque converter and reference numeral 12 designates generally a compound planetary gear unit. Clutch means and brake means are shown in FIG. 1 at 14, 16, 18, 20 and 22. The clutch means, the brake means, the gear unit and the hydrokinetic unit cooperate to define plural torque delivery paths between an engine driven crankshaft 24 and a power output tailshaft 26, the latter being connected through a differential and axle assembly and a drive shaft to vehicle traction wheels.

Torque converter 10 comprises a bladed impeller 28, a bladed turbine 30, a bladed stator 32 and an overrunning brake 34 which is adapted to anchor the stator 32 against the housing to prevent rotation in one direction but to permit rotation in the opposite direction. The bladed impeller 28, turbine 30 and stator 32 cooperate to define a toroidal fluid flow circuit in known manner, the impeller 28 being driven by the crankshaft 24 and the turbine 30 being connected to a turbine sleeve shaft 36.

Gear unit 12 comprises a ring gear 38, a large diameter sun gear 40, a small diameter sun gear 42, a set of long planet pinions 44 and a set of short planet pinions 46. The pinions 44 and 46 are mounted on a common carrier 48 and are adapted to mesh with each other, pinions 44 also meshing with ring gear 38 and with sun gear 40. Pinions 46 mesh both with the pinions 44 and with the sun gear 42. Ring gear 38 is connected drivably to tailshaft 26.

A brake band for brake means 22 surrounds a brake drum connected directly to the carrier 48. An overrunning brake or coupling 50 also provides a torque reaction flow path to a stationary part of the housing from the carrier 48. Coupling 50 is effective to establish a torque reaction point during normal acceleration of the vehicle. If torque is delivered through the gear system in a reverse direction such as during reverse drive or during coasting, brake band 22 is applied. Coupling 50 and brake band 22 act in parallel relationship.

Clutch 20 is applied to establish a torque delivery path between the turbine shaft 36 and the small sun gear 42 during operation in the forward drive ranges, except for overdrive range. Clutch 18 establishes a driving connection between turbine shaft 36 and the large sun gear 40 as it is applied during reverse drive operation. Friction brake 14 is applied to distribute reaction torque from gear 40 to the housing during intermediate speed ratio operation. An overrunning brake or coupling 52 is disposed in series relationship with the friction brake 14 and acts to deliver reaction torque to the applied friction brake during intermediate speed ratio operation.

Forward and direct drive clutch 54 connects the central shaft 56 to the carrier 48 during overdrive operation, the shaft 56 being connected directly to the engine crankshaft 24.

First speed ratio is achieved by applying brake band 22 thereby anchoring the compound carrier 48. With the brake band 22 applied and with the forward clutch 20 applied, turbine torque is delivered to sun gear 42 and ring gear 38 is driven in a forward driving direction at maximum torque ratio. As mentioned earlier, either overrunning coupling 50 or brake band 22 is capable of providing a torque reaction point during low speed ratio operation, the brake band 22 being capable of accommodating reverse torque transfer through the gearing which occurs during coasting. All the torque delivered to the transmission mechanism uses the hydrokinetic torque converter as a torque flow path.

A ratio change to the intermediate ratio is achieved by engaging friction brake 14 which causes sun gear 40 to act as a reaction member as reaction torque is delivered through the coupling 52 and through the engaged brake 14. Sun gear 42 still acts as a torque input element such as connected to the turbine shaft through the engaged clutch 20.

Third speed ratio operation establishes a split torque delivery path as clutch 54 is applied. Turbine torque is delivered through engaged clutch 20 to the sun gear 42, but a portion of the engine torque bypasses the converter and is distributed directly through the shaft 56 and through the engaged clutch 54 to the carrier 48. Thus only a portion of the engine torque is delivered hydrokinetically and the balance is distributed mechanically.

Fourth speed ratio operation is achieved by engaging overdrive brake band 16 while clutch 54 and brake 14 remain applied and clutch 20 is released. With the sun gear 40 acting as a reaction point, ring gear 38 is overdriven as engine torque is delivered through the shaft 56 and through the clutch 54 to the carrier. All of the torque is distributed mechanically and none of it is distributed hydrokinetically.

Reverse drive is achieved by engaging simultaneously brake band 22 and clutch 18.

If the vehicle is braked suddenly while the transmission mechanism is in the fourth ratio or in the third ratio, there may be a tendency for the engine to be decelerated rapidly thereby causing it to stall. This is due to the fact that either all of the braking torque or a portion of it is distributed mechanically because of the direct driving relationship between the engine crankshaft and the shaft 26 or the partial mechanical connection therebetween depending upon whether the fourth ratio or the third ratio is in effect. The improvement of my invention overcomes this problem.

In FIG. 1C I have shown the output shaft 26 mounted within tailshaft extension housing 58. Shaft 26 is journalled in bearing sleeve 60 which forms a part of the transmission housing and is journalled also by an outboard bearing and fluid seal arrangement 62 within the outboard end of the housing 58.

A compound governor assembly 64 is connected drivably to the shaft 26. Governor 64 includes a counterweight 66 and a governor valve body 68. Counterweight 66 is provided with an opening 70 through which the shaft 26 extends. The opening is provided with a keyway or groove 72 which receives therein a drive ball 74 located in a registering pocket formed in the surface of the shaft 26.

The governor valve body 68 is provided with a pair of shoulders as shown at 76 and 78 in FIGS. 2A and 2B through which clamping bolts 80 and 82 extend. Bolts 80 and 82 secure the governor valve body 68 to the counterweights 66. Reference may be made to U.S. Pat. No. 3,032,049 for a description and a drawing of the function and structure of the governor valve body and the associated valve elements.

The counterweight 66 has an opening 84 through which the shaft 26 extends. A groove 86 is formed in the opening 84 and a ball stop 88 carried in a socket 90 in the shaft 26 registers with the groove 86. The counterweight 66 is adapted for limited rotation relative to the shaft 26. The extent of the angular displacement of the governor body 66 relative to the shaft 26 is limited by the ball stop 88.

Governor body 68 and counterweight 66 are held axially fast on the shaft 26 by a snap ring 92 received in snap ring groove 94. Surrounding the snap ring 92 is a coil spring 96, one end of which extends radially inwardly between the ends of the snap ring 92 and is secured to the shaft 26 as shown at 98. The other end of the spring 96 is secured to the counterweight 66 and held in place by a spring retainer notch 100. The spring 96 when it is assembled has a preload that tends to urge the counterweight 66 in a clockwise direction as seen in FIG. 2B so that the ball 88 rests against one side of the locating groove 86. The direction of normal rotation of the governor assembly is designated in FIG. 2B by the arrow ω.

In FIGS. 3A and 3B I have shown an alternate governor assembly having parts that are common to the embodiment of FIGS. 2A and 2B. The common elements for both embodiments are designated by common reference characters, although in FIGS. 3A and 3B the reference characters include prime notations.

A retainer ring 102 holds the governor body 66' in axially fast relationship with respect to the shaft 26. Counterweight 66' engages shoulder 104 on the shaft 26'. A corresponding shoulder 106 is formed on the shaft 26 in the embodiment of FIGS. 2A and 2B.

Retainer ring 102 is received in snap ring groove 108 in the shaft 26'. Retainer ring 102 includes a drive lug 110 received in an opening 112 in the shaft 26'. One end of the retainer ring 102 extends in a tangential direction as shown at 112. The end of the tangential retainer ring extension 112 is engaged by one end of a coil spring 114. The other end of the coil spring 114 is connected to spring retainer 116, which is anchored by the governor valve body 68' and held in place by bolt 80'. The spring 114 is tensioned normally to urge the counterweight 66' in a clockwise direction relative to the shaft 26'.

The ball stop 88', as in the case of the embodiment in FIGS. 2A and 2B, limits the angular displacement of the governor counterweight 66' relative to the shaft 26'.

Figure 4A:
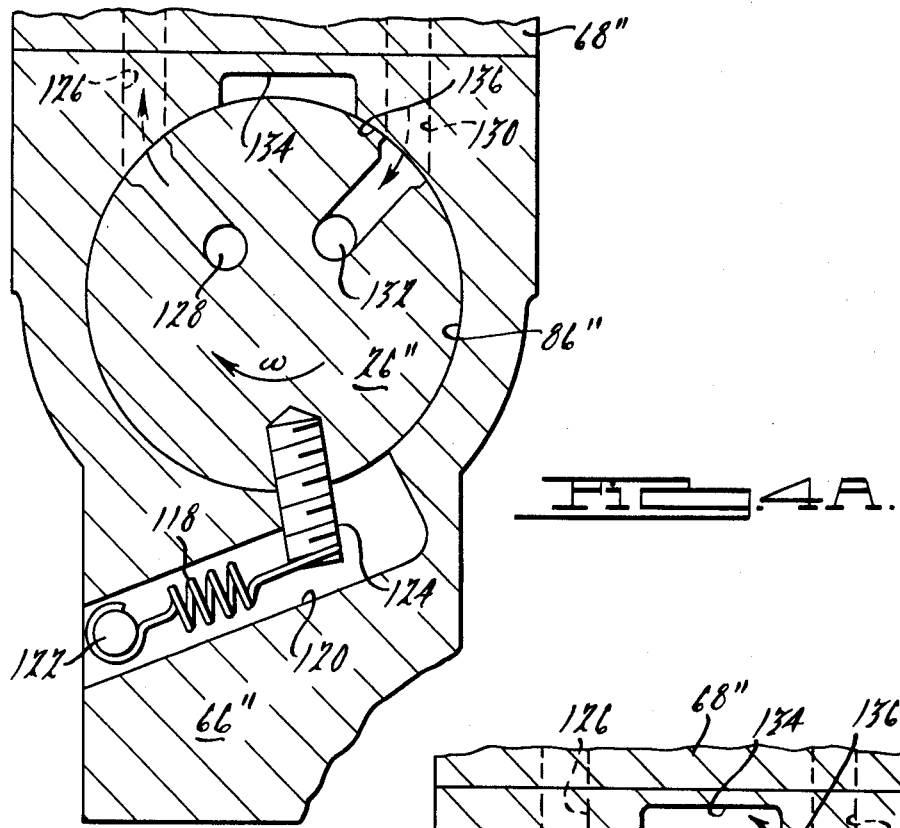
FIGS. 4A and 4B show in schematic form a modified governor assembly capable of performing the function of the embodiment of FIGS. 2A and 2B.
Figure 4B:
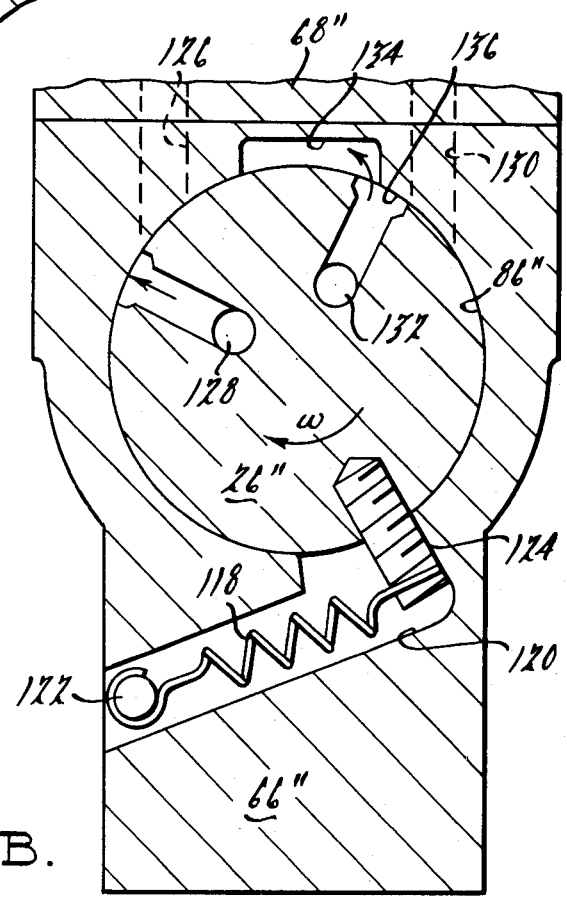

The embodiment of FIGS. 4A and 4B is substantially the same as the two embodiments described in the preceding paragraphs although the spring arrangement differs. In the embodiments of FIGS. 4A and 4B a tension spring 118 is located in an opening 120 formed in the counterweight body 66". One end of the spring 118 is anchored on an anchor pin 122 carried by the counterweight 66". The other end of the spring 118 is connected to set screw 124 threadably received in the shaft 26 and extending radially therefrom. Set screw 124 registers with the opening 120 in the counterweight 66".

FIG. 4A shows the shaft 26" and the counterweight 66" in its normal position during operation of the transmission. During rapid deceleration of the vehicle the counterweight 66" shifts relative to the shaft 26" to the position shown in FIG. 4B. The normal forward driving rotation of the shaft 26 is illustrated by the arrow ω in FIGS. 4A and 4B.

The elements of the embodiment of FIGS. 4A and 4B that are common to the two embodiments described in the preceding paragraphs are designated by similar reference characters although double prime notations are added.

During rotation of the governor assembly and the output shaft 26 the governor valve, as described in U.S. Pat. No. 3,043,322, responds to centrifugal forces to create a pressure signal that is related in magnitude to the speed of rotation of the shaft 26' or 26". Fluid pressure is supplied to the governor valve assembly through a port 126 as shown in FIG. 4A. This port communicates with a supply passage 128 in the shaft 26". A port 126 communicates with a corresponding supply pressure port in the governor valve body 68'.

The pressure signal developed by the governor assembly is distributed to a governor pressure outlet port 130 which in turn communicates with the governor pressure passage 132 in the shaft 26". The governor pressure passage 132 communicates with the governor control body for the automatic transmission. A vent port 134 formed in the counterweight 66" communicates with an exhaust port in the governor assembly.

The portion of the opening 86" between the vent 134 and the governor pressure port 130 acts as a rotary valve land and is designated by the reference character 136.

Figure 5A:
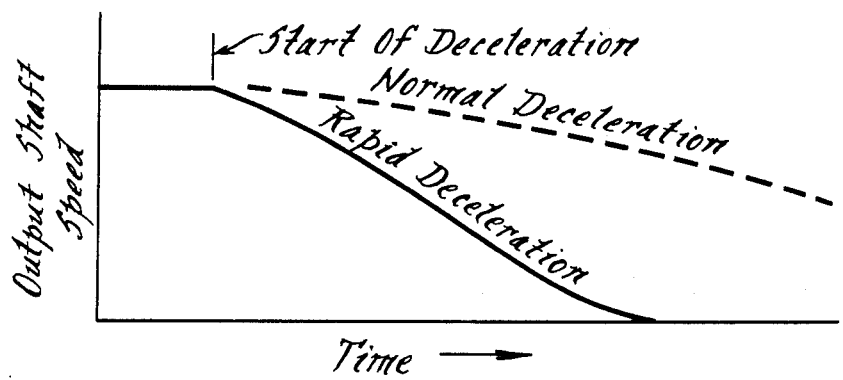
FIGS. 5A, 5B and 5C show the governor characteristics of the invention.
Figure 5B:
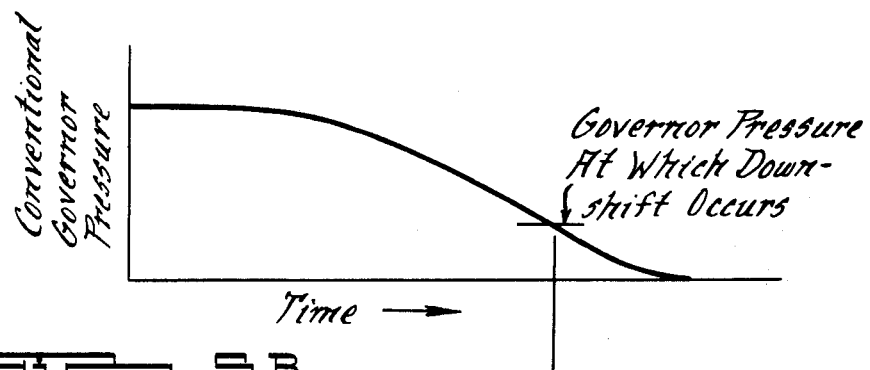

In FIG. 5A I have shown the relationship between the speed of rotation of the output shaft 26 and the time during deceleration of the vehicle following relaxation of the engine throttle. The dotted line in FIG. 5A represents the normal deceleration during any given time beginning from the instant the throttle is relaxed. The full line shown in FIG. 5A represents the deceleration of the vehicle with respect to time when the vehicle operator applies the vehicle brakes to effect a more rapid deceleration. In FIG. 5B I have shown the relationship between governor pressure and time beginning at the instant the engine throttle is relaxed for a conventional governor arrangement such as those described in the previously mentioned prior art patents. The point at which governor pressure will initiate a downshift of the transmission shift valves is indicated in the curve.

Figure 5C:
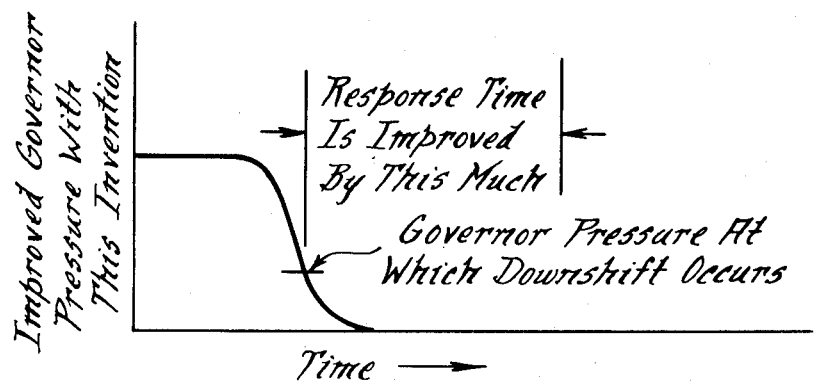

FIG. 5C represents a governor pressure of the present invention in contrast to a conventional governor pressure characteristic shown in FIG. 5B. The point at which governor pressure causes a downshift of the shift valves, as seen in FIG. 5C, has been shifted to the left a substantial distance. Thus the downshift will occur quicker with the improved governor assembly of my invention thereby avoiding the excessive deceleration of the engine and avoiding a tendency for the engine to stall. That tendency exists as explained previously because of the fact that the driveline, during operation in the fourth ratio, is fully mechanical and is partly mechanical during operation in the direct drive one-to-one ratio. The torque converter, which normally cushions the deceleration of the engine in conventional drivelines, is removed or partially removed in the case of the transmission illustrated in FIG. 1A. The improved governor assembly is adapted, therefore, particularly to be used in a driveline of the type shown in FIG. 1A.

As seen in FIGS. 4A and 4B the governor pressure passage normally communicates with the outlet port of the governor valve assembly as seen in FIG. 4A. Upon deceleration of the vehicle at a rate represented by the full line curve of FIG. 5A, the counterweight 66' will shift to the position shown in FIG. 4B whereby the land 136 will be uncovered by the governor pressure passage 132 so that the governor passage in the valve body for the transmission will be vented through the vent port 134. Simultaneously, land 136 blocks communication between governor pressure outlet port 130 and the governor passage 132. When deceleration is discontinued, the counterweight 66' will be shifted once again by the pretension of return spring 118 to the normal driving position of FIG. 4A. The other embodiments of FIGS. 2A through 3B operate in substantially the same fashion as the embodiment of FIGS. 4A and 4B.

Having described preferred forms of my invention, what I claim and desire to secure by U.S. Letters Patent is:

I claim:

1. In a governor valve assembly for an automatic transmission in an automotive vehicle driveline having an internal combustion engine:
   a driven shaft forming a torque output member for said transmission;
   a governor body connected to and rotatable with said driven shaft, said body having an opening through which said shaft extends, said body being rotatable relative to said driven shaft, stop means for limiting relative angular displacement of said body and said driven shaft;
   spring means for biasing said body to a first position relative to said driven shaft as determined by said stop means, said body being angularly adjustable to a second position relative to said driven shaft in response to deceleration inertia forces acting on said body as said driven shaft is decelerated;
   a governor pressure port and a vent port in said body communicating with said opening at angularly spaced locations, and a governor pressure passage rotatable with said driven shaft and registering with said governor pressure port when said body and said driven shaft assumes said first relative position;
   said body being angularly adjustable to a second position relative to said driven shaft whereby said governor pressure passage is brought into communication with said vent port and said governor pressure port is blocked.

2. The combination as set forth in claim 1 wherein said body includes a pressure supply port communicating with said opening at an angularly spaced location relative to said vent port at one side thereof, said governor pressure port being located at the other side of said vent port, said driven shaft having a pressure supply passage and a pressure supply port in said body, said supply port communicating with said supply passage when said body and said driven shaft assume said first relative angular position and said pressure supply port being blocked when said body and said driven shaft assume said second relative angular position.

3. The combination as set forth in claim 1 wherein said spring means is under a pre-load stress and has one end thereof connected to said body and the other end thereof connected to said driven shaft whereby said body and said driven shaft normally are biased toward said first position, said body being angularly adjusted relative to said driven shaft toward said second position in response to deceleration inertia forces acting on said body.

* * * * *